United States Patent
Emelianov et al.

(10) Patent No.: US 8,984,510 B1
(45) Date of Patent: *Mar. 17, 2015

(54) BLOCKING FILE SYSTEM FOR ON-THE-FLY MIGRATION OF A VIRTUAL EXECUTION ENVIRONMENT

(71) Applicant: Parallels IP Holdings GmbH, Schaffhausen (CH)

(72) Inventors: Pavel Emelianov, Moscow (RU); Alexander G. Tormasov, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 261 days.

This patent is subject to a terminal disclaimer.

(21) Appl. No.: 13/757,748

(22) Filed: Feb. 2, 2013

Related U.S. Application Data (63) Continuation of application No. 12/832,878, filed on Jul. 8, 2010, now Pat. No. 8,370,837, which is a continuation-in-part of application No. 12/050,409, filed on Mar. 18, 2008, now Pat. No. 8,166,477.

(60) Provisional application No. 60/896,679, filed on Mar. 23, 2007.

(51) Int. Cl.
 G06F 9/455 (2006.01)
 G06F 17/30 (2006.01)
 G06F 7/06 (2006.01)

(52) U.S. Cl.
 CPC ........... G06F 17/30079 (2013.01); G06F 7/06 (2013.01)
 USPC .............................. 718/1; 707/622

(58) Field of Classification Search
 CPC .................................. G06F 7/00; G06F 7/06
 See application file for complete search history.

(56) References Cited

U.S. PATENT DOCUMENTS

| | | |
|---|---|---|
| 2002/0144018 A1 | 10/2002 | Knutsen et al. |
| 2005/0015354 A1 | 1/2005 | Grubbs et al. |
| 2005/0268298 A1 | 12/2005 | Hunt et al. |
| 2006/0268310 A1 | 11/2006 | Tamai et al. |

*Primary Examiner* — Camquy Truong
(74) *Attorney, Agent, or Firm* — Bardmesser Law Group (57) ABSTRACT

This invention relates to a method, system and computer program product for performing migration of a virtual execution environment from one network node to another node on the network. All active processes executing on a virtual execution environment are frozen and the state of these processes, including virtual execution environment network connectivity information, are saved into a dump file. The dump file is transferred to the destination network node. Using the information stored in the dump file, the execution state of all active processes and the state of network connections of the virtual execution environment are restored at the destination node to the state existing immediately prior to the migration.

19 Claims, 8 Drawing Sheets

BLOCKING FILE SYSTEM FOR ON-THE-FLY MIGRATION OF A VIRTUAL EXECUTION ENVIRONMENT

CROSS-REFERENCE TO RELATED APPLICATION

This application is a continuation of U.S. patent application Ser. No. 12/832,878, filed on Jul. 8, 2010, entitled BLOCKING FILE SYSTEM FOR ON-THE-FLY MIGRATION of A CONTAINER WITH AN NFS MOUNT, which is a continuation-in-part of U.S. patent application Ser. No. 12/050,409, filed Mar. 18, 2008, entitled SYSTEM AND METHOD FOR RESTORATION ENVIRONMENT FROM HIBERNATION INTO A VIRTUAL OR PHYSICAL MACHINE, which is a non-provisional application of U.S. Provisional Patent Application No. 60/896,679, filed Mar. 23, 2007, entitled SYSTEM AND METHOD FOR RESTORATION ENVIRONMENT FROM HIBERNATION INTO A VIRTUAL OR PHYSICAL MACHINE, both of which are incorporated by reference herein in their entirety.

BACKGROUND OF THE INVENTION

1. Field of the Invention

This invention relates to a method, system and computer program product for restoration of a real hardware server or a Virtual Machine server from hibernation.

2. Background of the Related Art

Current trends in system and application development involve ever increasing use of virtualized hardware. For example, cross-platform software now includes not only hardware- and operating system-independent user applications, but also operating systems themselves, as well as virtualization means for adaptation of "non-native" OS's to different hardware platforms. Examples of virtualized hardware are Virtual Machines that virtualize a processor and/or an operating system running on the processor. Examples of such Virtual Machines are marketed by, for example, Parallels Software International, Inc., Microsoft Corporation and VMware, Inc. Other examples of a virtualized server include a Virtual Private Server (VPS, sometimes referred to as a Virtual Environment, VE), such as those marketed by Parallels™.

Some "ready to start" techniques, such as LiveCD, LiveDistro or the like (http://**en.wikipedia.org/wiki/Live_cd), use a preferably prepared media containing all the data required for starting and execution of a set of processes without installation. They provide an option to start with any hardware configuration, but with fewer supported possibilities. Another disadvantage is that started system is used for certain purposes, e.g., for hardware testing or configuring and should be removed before starting a native operating system of the computer.

The simplest way to restart a Virtual Execution Environment (VEE) is by restoring it from backup files created continuously while running the VM/VEE, such as can be implemented by restoration software from Acronis, Inc. This approach could be used when restarting the VM/VEE in some current state, since some data, e.g., virtual memory state, is lost in the process of backing up the disk storage.

There are mechanisms in different operating systems that provide a hibernation feature, where a VM/VEE can be restored from a hibernating state, so that application programs can continue executing as if nothing happened.

Microsoft Windows™ 2000 (and later) supports hibernation at the operating system level without special drivers from the hardware manufacturer. Safe Sleep, the Apple Macintosh equivalent of "hibernate", has been available for new Mac models. In the Linux kernel, "Hibernate" or "suspend-to-disk" is implemented by the swsusp command, which is built into the Linux 2.6 series.

Analogous technology may be implemented in a virtual execution environment, e.g., VMware products implement a snapshot feature that captures the entire state of the Virtual Machine at the time it is snapshotted, including the state of all the Virtual Machine's disks, the contents of the Virtual Machine's memory and the Virtual Machine settings. Such a system is disclosed in U.S. Pat. No. 6,795,966.

For example, the operating system that uses IDs of devices (e.g., those of PCI devices) can function incorrectly or even hang if the System Identification Number is somehow changed between "sleep" and "resume".

What is a need in the art of cross-platform saving and restoration of a working state of the computing system. Nevertheless, cross-platform hibernation and restoration is now a problem that cannot be resolved easily, due to different data format of different files, where contents of the Virtual Machines should be migrated. Another problem is different peripheral devices used in different platforms, and even different peripheral device settings that may be used on the same platform.

SUMMARY OF THE INVENTION

Accordingly, the present invention is related to a system, method and computer program product for providing efficiency while pushing the Execution Environment (EE) contents out of operating memory into non-volatile storage device and further to performing EE functions using data of non-volatile storage, where the Execution Environment (EE) include real computing systems running applications and Virtual Execution Environments (VEEs).

This method relates to migrating execution environment to new hardware platform or new virtual platform. The method starts with running the execution environment on the hardware platform and suspending the execution environment and storing a state of the execution environment; then updating the stored state with drivers corresponding to a new hardware platform; then restoring an updated state on the computing system on the new hardware platform; then continuing operation of the execution environment on the new hardware platform. The state of execution environment includes operating memory state and nonvolatile storage stage.

The method also relates to on-the-fly migration of a container from one physical or virtual network node to another. In this case the method comprises freezing any activity in the container that is being migrated, including the activity of all processes and network connectivity; dumping the state of all tasks in the container; moving files and dumped state to another platform; recreating the container from the dumped state and resuming the container activity transparently to the users of that container.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Execution Environment (EE)—a virtual or physical machine intended for program code execution determined by basic hardware and software characteristics.

VEE—a type of environment that supports program code execution, where at least a part of the real hardware and software required for running program code are presented as their virtual analogs. From the point of view or the user, that the code in VEE runs as if it were running on the real computing system.

VPS—Virtual Private Server (or VE), also referred to as a container, is one type of a Virtual Execution Environment (VEE) running on the same hardware system with a shared OS kernel and most of the system resources, where isolation of Virtual Execution Environments is implemented on the namespace level. A Virtual Private Server (VPS) is a closed set, or collection, of processes, system resources, users, groups of users, objects and data structures. Each VPS has an ID, or some other identifier, that distinguishes it from other VPSs.

The VPS offers to its users a service that is functionally substantially equivalent to a standalone server with remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and web servers, etc. In other words, the full range of system administrator functions is desirable, as if the VPS were a dedicated remote server, with the existence of the VPS being transparent from the perspective of both the VPS user and the VPS administrator.

VM—a type of an isolated Virtual Execution Environment running on the same physical machine simultaneously. Each Virtual Machine instance executes its own OS kernel. Support of Virtual Machines is implemented using a Virtual Machine Monitor and/or a Hypervisor. An example of a VM is a VMware Virtual Machine, or Parallels VM.

Hypervisor—control software having the highest privilege level for administrating hardware computer resources and Virtual Machines. One embodiment of a hypervisor is used in the Xen open source project and virtualization for Windows Server "Longhorn" (Veridian).

Virtual storage—block-level storage space that may be regarded by the user of a computer system as addressable hardware storage, or a storage partition, using virtual addresses that are utilized during virtual disk input/output operations as physical addresses.

Disk image—a set of data that represents contents of a disk storage or contents of a partition corresponding to virtual storage on a block level.

Migration—process of suspending execution environment and starting it on the different hardware platform using intermediate data container. Optionally, data in an intermediate data container may be converted to another format or to be updated to provide hardware compatibility.

VM snapshot—data required for starting a VM in exactly the same state when it was at the prior moment. Since the snapshot is stored as a file, some modification to the file may be implemented before restarting execution environment from the snapshot. One example of the snapshot is Virtuozzo™ process checkpointing.

Hiberfile—a file that contains data that correspond to all or just necessary operative memory blocks of the computing system and processor settings at a certain moment in time. Optionally it may contain other hardware settings and disk data.

Network File System (NFS)—a client/server application that allows all network users to access shared files stored on the network computers of different types. One example of NFS is a Storage Area Network (SAN). NFS provides access to shared files through an interface called the Virtual File System (VFS) that executes on top of the TCP/IP layer. Users can manipulate shared files as if they were stored locally on the user's own hard disk drive. With NFS, computers connected to a network operate as clients while accessing remote files, and as servers while providing remote users with access to local shared files. The NFS standards are publicly available and widely used.

Blocking File System (BFS)—a file system that has two states, a blocking state and a restarting state. When the BFS is first mounted, it is mounted in a blocked state, which means that any request directed to it (such as "open file", "read" or "write" to it, report statistics, etc.) results in blocking the requesting task in a so called "unkillable" state. Subsequently, the file system is transitioned to a restarting state.

On-the-fly migration of a container—transferring a container from one network node to another network node, and preserving the state of all processes running in that container at the time the migration is initiated.

The present invention provides for embedding Execution Environments (EEs) into different hardware platforms in the state as if it were snapshot or hibernated at a previous point in time.

One feature is storing a current state of the real machine or a Virtual Machine in an available form and then using the stored data, e.g., memory state and state of the processor's registers when restarting the EE. Further, the EE can be restored with new hardware settings. The process of updating hardware settings, including replacing hardware settings or new hardware installation, may be performed in the process of EE restoration, or before or after EE restoration.

In some embodiments, environment settings may be updated for effective hardware support before EE restoration by updating a previously-stored EE hiberfile or snapshot. Also, the VEE can be migrated into a new mode of the same hardware system, e.g., using INTEL Virtualization Technology for Directed I/O. Another embodiment may include updating a hiberfile to allow restoration of the real machine on different hardware.

Another alternative may include predefined setting patches applied to the snapshot before or during restarting a EE from the snapshot.

Another alternative may include virtualization of the original hardware (e.g., SCSI drives or LAN) required for effective restarting of the EE and then updating corresponding drivers to drivers required by the current user.

Required drivers can be not only real hardware drivers that are available for new platform where the EE is restarted, but also drivers where new virtual hardware is used. For example, some virtualized devices may be the new ones. In other embodiments, the system may be hibernated on real hardware and restored on a Virtual Machine with the virtual devices being the same as if it were in a real hardware box or otherwise in a real computing system.

For implementation of this or other embodiments, INTEL VT-d technology or similar, e.g., AMD DEV, may be used. Also, a back up of the storage device of the EE might be used. For example, if the EE restoration is performed on the same computing system, the original storage device may be used for restoring the EE. A snapshot of the EE needs to be created and used to restart in the EE on a new hardware platform (real or virtual).

A hiberfile is a hibernation system file and may contain the full contents of the system random access memory (RAM). Hibernation is a special kind of shutdown. The system stops all activity, and the hibernation system writes the contents of RAM and some CPU settings to a special file on the hard drive (often called "hiberfil.sys" or similar). When the computer (such as a laptop) awakens from hibernation, it does not go through a full reboot. Instead, it loads the contents of the hibernation file into memory, and thus restores the exact same condition the hardware system was in, when the hibernation was started, optionally by re-initialization of the hardware. Note that hibernation is supported by all modern operating systems, e.g., Windows, Linux and MacOS.

Since VM technology (e.g., computer systems with a VMM or a Hypervisor) uses virtualization means and the virtualized OS may, in some sense, be considered a user application, the VM, in any state, may be suspended and its state may be stored on a mass storage device without suspending of the whole supporting hardware system. Different virtualization technologies use different formats of the snapshot, but most of them can store contents similar to hiberfile information. In other words, using a hiberfile or a snapshot provides for restoring the EE in the same condition as if it was not interrupted.

Knowing the rules of snapshot image creation and the principles of memory management, it is possible to convert a hiberfile image of the real system to a snapshot of the Virtual Machine, and to convert the snapshot of one VEE with random settings, but matched to certain tasks to a snapshot of the VEE, similar to a real execution environment, e.g., with settings requested by user.

Problems related to hardware differences may be avoided either at the conversion stage or after the start of the EE from a snapshot or a hiberfile image. The simplest way may be, for example, using Parallels Software International, Inc. technology for interrupt handling, where interrupts are triggered during a first attempt to call an illegal device or a device that is not installed in the shell of the VEE.

Also, a lightweight VMM used for Intel Embedded IT or Intel® Active Management Technology (Intel® AMT) (see http://www.intel.com/technology/magazine/systems/it09041.pdf) or vPro (see http:**www.intel.com/cd/channel/reseller/asmona/eng/products/desktop/platform/vpro/learn/index.htm) may be used, which allows direct control of at least some of the hardware from a Virtual Machine.

When the drivers do not match or are not all available after the restart, they could be downloaded or provided by the user, and then installed, or replace the existing ones.

Thus, the invention may be used for porting an active EE from one hardware platform to another, with minimal downtime. The hardware platform may be either a real platform or virtual platform. As an option, where the EE is porting from one real hardware platform to a different real hardware platform, one hiberfile may be converted to another hiberfile, similar to conversion of snapshot image of the VM. In this implementation, runtime updates of an image, replacing drivers, etc. may be performed.

Minimal booting time is required for starting the ported EE on a different hardware platform, since operating system initialization is not required. Updating of the hardware drivers may be implemented by using on-the-fly patching technology, e.g., NuMega SoftICE (a kernel mode debugger for Microsoft Windows designed to run underneath Windows such that the operating system is unaware of its presence) (see http://en.wikipedia.org/wiki/SoftICE, though the software is not currently supported by developers).

This technology may be used for driver debugging and debugging functions of the kernel of the operating system. One embodiment of such a technology is described in U.S. patent application Ser. No. 10/725,016; Filed: Dec. 2, 2003, entitled System, Method and Computer Program Product for On-The-Fly Patching of Executable Code, incorporated herein by reference.

Another embodiment of the invention may use OS and hardware embedded functions, such as Plug-and-play (PnP) signals, to force the OS to replace hardware (real or emulated) by PnP signals issued due to new hardware appearance. An example of such a system is disclosed in U.S. Pat. No. 7,111,086 assigned to VMware, Inc.

Preliminary prepared patches, such as SWSoft's (Parallels®) Virtuozzo™ technology or replacing driver calls by interrupt instructions (Parallels Software International, Inc. technology) may be used for adaptation of the image (mainly hiberfile image) to the hardware platform. In this case, hardware critical for starting execution environment may be initially emulated, other hardware calls may by initially ignored or redirected using interrupts and on-the-fly code analysis.

In an off-line version, the system is shut down, and a set of files that represent the state of Virtual Machine at the moment of shut down stored on a disk. When the set of files has to be restarted from the disk, the hardware settings may require configuration and readjustment to be compatible with the hardware platform.

In an on-line version, the snapshot is generated without interrupting the system, on-the-fly. For example, when a snapshot is generated from a live VM, there is always a concern for possible discrepancies and inconsistencies between what is actually on the disk and what the VM "thinks" is on the disk. Ideally the snapshot is generated when all the processes are finished, however, in the reality the snapshot could attempt to be generated while some processes are still running (e.g., writing to the disk is still taking place). If that is the case, the transient processes must be completed to avoid inconsistencies between the reality and what VM "thinks" the reality is.

It should be noted that some emulation may be required permanently, e.g., when virtual storage of a Virtual Machine is used after porting a disk drive of the standalone OS. After porting (migrating), most of user processes running under the control of the OS kernel stay active and continue working with the same contents.

The invention may be used for switching a system from real hardware to virtual or back and may also be used for switching between real hardware platforms or between virtual hardware when required for resolving specific tasks, e.g., 3D graphics applications optimization that require different 3D graphics hardware; accelerating tasks previously running in the VM with some performance degradation; testing execution environment for new hardware compatibility; executing hardware testing in less time; starting the entire operating system in a background mode; emergency secure isolation of the operating system, and so on.

Since boot loading in the present invention is drastically simplified, the invention can resolve some problems of booting operating systems on non-native hardware platforms, e.g., swapping guest and host OS's may be performed.

One more option for driver tuning during creation of the hyberfile is to install redirection procedure implemented as a (native for EE) driver that only redirect I/O requests to an already installed hardware driver corresponding to hardware configuration. The redirection procedure transparently replaces the native driver of the EE.

Scalability and portability of any operating system is provided, since operating system resources may be dynamically allocated to any hardware environment and are substantially independent of the hardware storage configuration. Optionally, the physical system may be suspended and resumed on different hardware boxes or in Virtual Machines with different hardware, including Virtual Machines running on remote (as opposed to local) hardware systems.

The Virtual Execution Environment, as discussed herein, may be of any number of types. For example, they can be Virtual Private Servers. They can be Virtual Machines, such as those from VM ware or Microsoft. They can be Virtual Machines, in the model of XEN, that use a Hypervisor and a Service OS. They can also be Virtual Machines that utilize a Lightweight Hypervisor, such as those marketed by Parallels Software International. Also, SWsoft, Inc.'s isolated Virtual Execution Environments, such as Virtuozzo™, may be used as another example.

An example of technology available for updating execution environment snapshot where disk storage format differs from one platform to another is disclosed in U.S. patent application Ser. No. 11/757,598; Filed: Jun. 4, 2007, entitled: SYSTEM AND METHOD FOR MANAGEMENT OF VIRTUAL EXECUTION ENVIRONMENT DISK STORAGE, incorporated herein by reference.

The example of effective driver adjustment that may be implemented in the present invention is disclosed in U.S. patent application Ser. No. 11/673,585; Filed: Feb. 11, 2007, entitled: SYSTEM AND METHOD FOR USING VIRTUAL MACHINE FOR DRIVER INSTALLATION SANDBOX, incorporated herein by reference.

One embodiment of code modification that may be implemented for effective code adaptation to hardware requirements is disclosed in U.S. patent application Ser. No. 10/725,016; Filed: Dec. 2, 2003, entitled System, Method and Computer Program Product for On-The-Fly Patching of Executable Code, incorporated herein by reference. The technology may be implemented for replacing drivers, including usage of redirection procedures for redirecting requests to drivers corresponding to the actually installed hardware.

Figure 1:
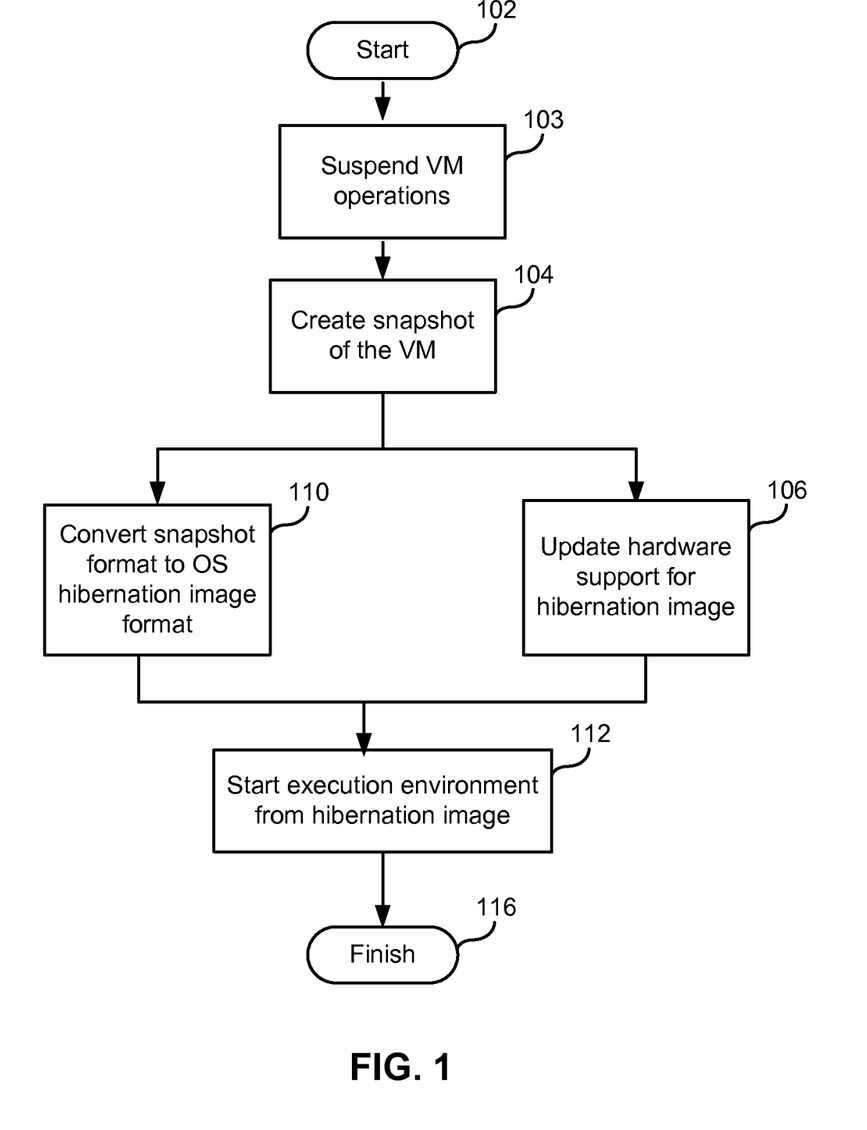
FIG. 1 is a flowchart of embedding a Virtual Execution Environment (VEE) from a real to a virtual hardware platform.

FIG. 1 illustrates an embodiment where the VEE is ported from a virtual hardware platform to a real hardware platform. After start (step 102), in step 103, the virtual hardware platform suspends VEE operations. In step 104, virtual memory and VM settings related to the current state of the VEE is captured by a snapshot and the snapshot is stored as a file or as a set of files in the format defined by the particular VM implementation and the hardware that the VM is emulating.

In step 110, the data in the snapshot is converted to a format native to the real hardware of the computing system. Converted data provides for execution of code contained in the snapshot from the point (or the nearest point) from the instruction where the VEE was suspended. The data is then stored in a format providing starting executable instructions on the hardware platform, e.g., as a hyberfile.sys file usable by OS Windows.

As additional steps data related to the execution environment settings may be updated, e.g., data related to number of CPUs, related to CPU type, CPU vendor (e.g., Intel or AMD), available memory size, Advanced Programmable Interrupt Controller (APIC) version, CPU architecture (32 bit or 64 bit), and so on. This update may be done for each migration direction while performing migration from one platform (virtual or real) to another platform (virtual or real). Also, some execution environment identification and authentication data may be updated, including data that characterize environment itself, e.g., IP address of the server, MAC-address data, CID, security keys for digital signature, domain attributes, SID, user ID, user account data or the like.

Also, in step 106, code analysis software checks program instruction sequences require modification and, optionally, settings and drivers of the OS previously virtualized for this VM and loads hyberfile execution without abnormal termination. During step 106, OS template support, analogous to SWsoft's (Parallels®) Virtuozzo™ technology, may be implemented for embedding required software or substituting some instructions by interrupts then being handled with software debugger, as implemented in Parallels Software International, Inc.'s Virtualization technology.

Some other embodiments may include usage of Xen hypervisor, VMware Virtual Machine Monitor, Sun container, Microsoft Virtual Server, Parallels Virtual Machine, SWSoft (Parallels®) Virtuozzo™ VE or the like. In some embodiments, technologies similar to paravirtualization may be used for providing a software interface to Virtual Machines that is similar but not identical to that of the computing system hardware. In one embodiment of such implementation, when a request by the execution environment's (EE's) driver could not be implemented on the kernel level, the request is redirected to an external driver implemented, e.g., in the hypervisor or in VMM or on the application level.

Also, for Plug-and-play (PnP) compatible devices, PnP signals may be used for replacement drivers or driver installation using stubs. To implement this option, a so-called "stub" driver may be installed before stating environment from the snapshot or hiberfile. The stub driver further may be used as a placeholder for driver required by execution environment or hardware conditions or may be used as a redirection module providing access to appropriate driver. Note that steps 110 and 106 may be implemented simultaneously or independently from each other. When step 110 and at least a part of step 106 (sufficient for safe execution of hiberfile instructions) are implemented, the hardware system starts from hiberfile.

In step 112, execution environment operation is restarted from the image, and the process ends in step 116.

Figure 2:
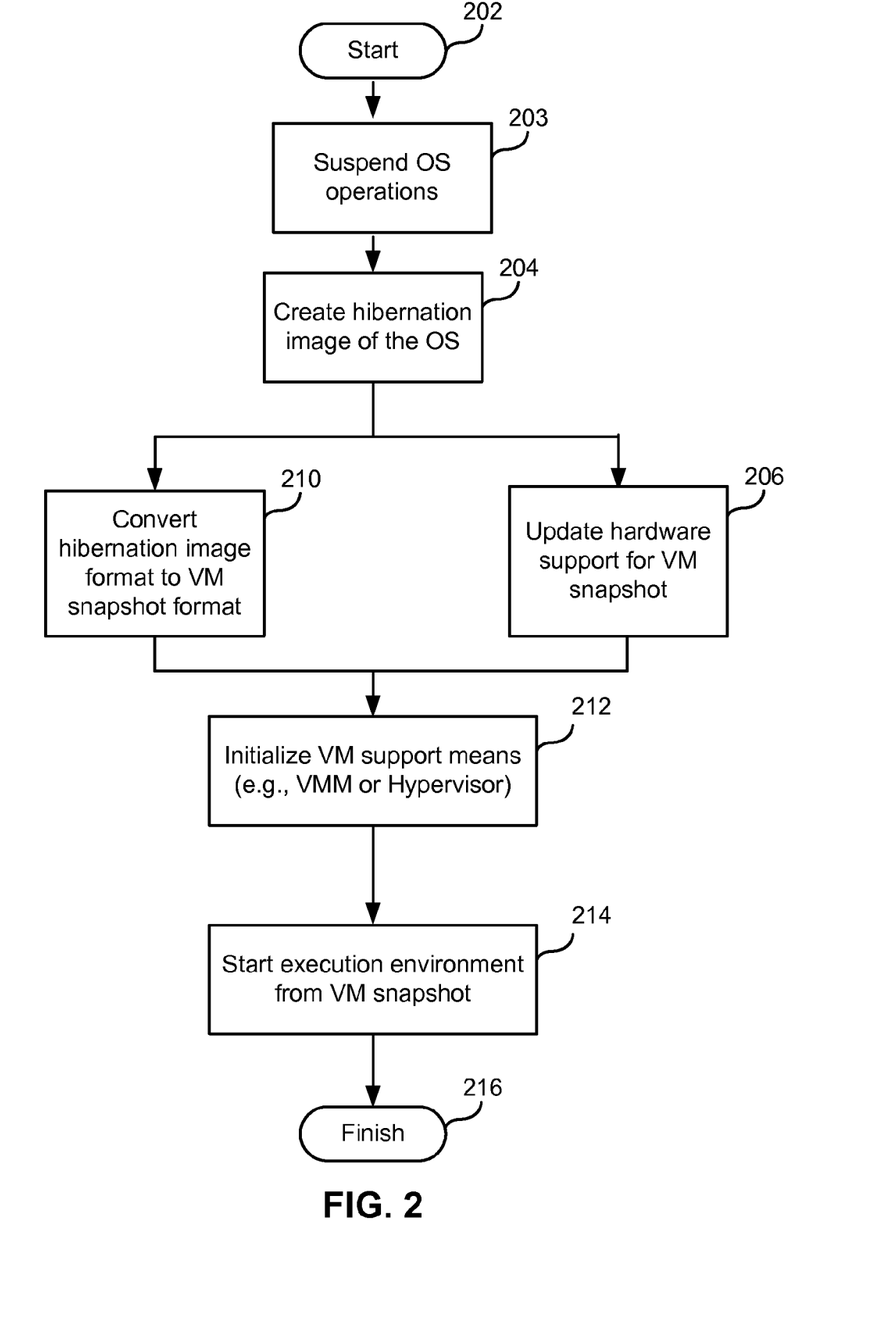
FIG. 2 is a flowchart of embedding a VEE from virtual to real hardware platform.

FIG. 2 illustrates another embodiment of the invention where a VEE is ported from a real hardware platform to a virtual hardware platform.

After start (step 202), in step 203, the hardware platform suspends VEE operations. In step 204, all memory and processor settings related to the current state of the VEE are stored in the hiberfile or in a similar set of files in the format defined by running OS or defined by software means embedded to the hardware system independently from the OS.

In step 210, the data in the snapshot is converted to a format native for the virtual environment to which the VEE should be ported. Indeed, the Virtual Machine may be viewed as available for direct start of operations from hiberfile. The data from which the VEE should start should provide the possibility of execution code containing in the hiberfile or a snapshot into which the hiberfile is converted from the point (or the nearest point) of the instruction where the VEE was suspended. In the latter case, the data is stored in a format providing for starting executable instructions on the virtualization platform, e.g., as a snapshot image, as mentioned earlier.

Also, in step 206, code analyzing software checks program instructions and, optionally, settings and drivers of OS where the execution environment was previously run. This step provides for a possibility of loading hiberfile or snapshot execution without abnormal termination. Step 206 may be implemented in a number of ways. One alternative is adjusting the Virtual Environment setting as if it were hardware platform where the VEE was previously run. Another alternative is adjusting snapshot configuration according to an already-configured VM. Another alternative is adjusting a VM based on the user's choice and then adjusting snapshot configuration according to the VM configuration.

Other alternatives are also possible. OS templates support analogous to Virtuozzo™ technology may also be implemented or may be implemented by substituting some instructions in the snapshot or hiberfile by interrupts then being handled with software debugger as implemented in Parallels Virtualization technology. Note that steps 210 and 206 also may be implemented simultaneously or independently from each other. When step 210 and at least a part of step 206 (sufficient for safe execution of hiberfile or snapshot instructions) are implemented, the VEE may start in the virtual hardware environment. In step 212 VM support means are initialized, e.g., VMM or hypervisor starts under the support of the Host OS and, in step 214, the execution environment may be started from the snapshot. The process finishes in step 216. Note that even a real machine can start from hypervisor as a VEE. In this embodiment, the boot partition and the boot VM may be created to start the environment of a real machine inside a virtual environment.

Figure 4:
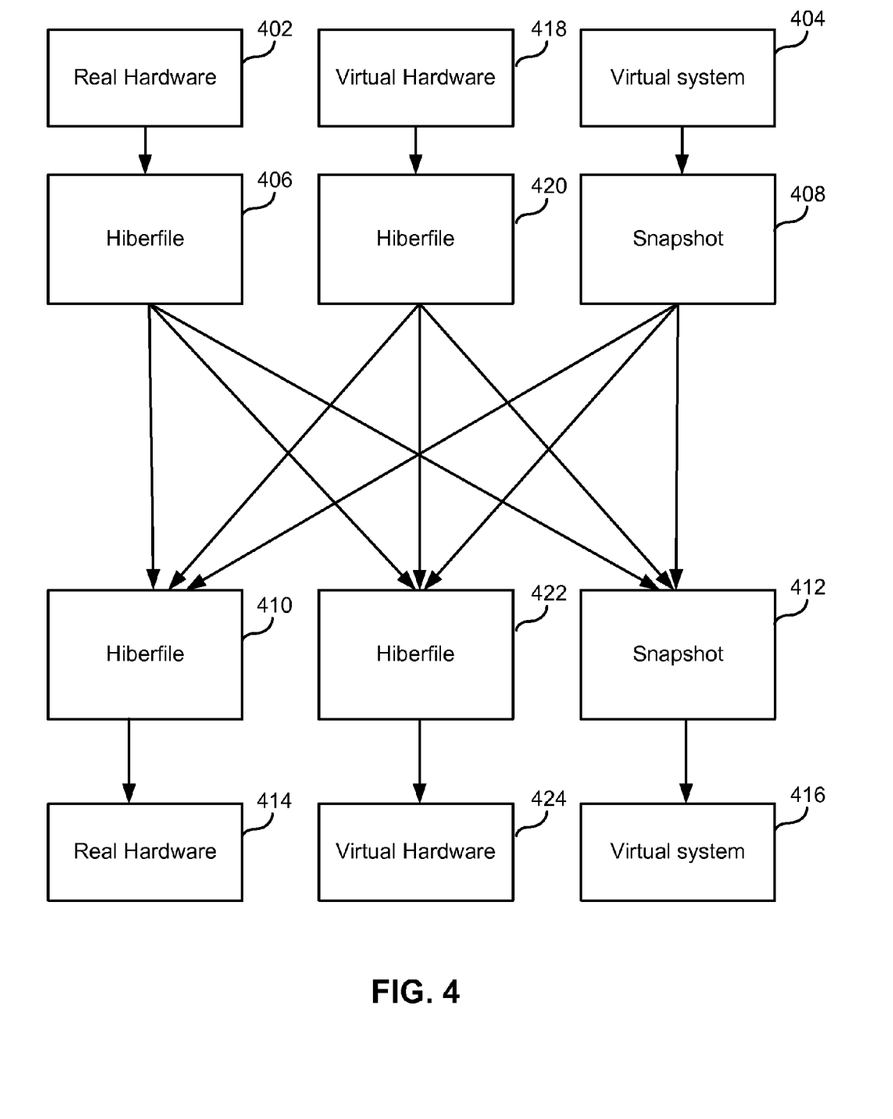
FIG. 4 reflects different combinations of migration implemented in the present invention.

FIG. 4 shows some of the embodiments where the invention may be implemented. Using the invention, an execution environment may be migrated from real hardware 402 to a virtual system 416 and from a virtual system 404 to real hardware 414 using conversion of hiberfile 406 to snapshot 412 and of snapshot 408 to hiberfile 410. This process may take place through an intermediary step of virtual hardware 418 migrating to a virtual system 416 or to real hardware 414 using conversion of intermediary hiberfile 420 to hiberfile 410 or to snapshot 412. Further, an execution environment may be migrated from real hardware 402 to a virtual hardware 424 and from a virtual system 404 to a virtual hardware 424 using a migration of hiberfile 406 to hiberfile 422 and using conversion of snapshot 408 to hiberfile 422.

However, when real hardware systems 402 and 414 are identical (in terms of their physical characteristics), and virtual systems 404 and 416 are the same virtual platforms (in terms of the hardware they are emulating), the migration task is easier, when the systems are substantially different, the invention may also be used for migration process between physical boxes, where the hardware box on which the VEE should be restarted can be different from the original hardware box where the VEE was originally running. The invention may also be used the real hardware system is places inside the virtual system. After restarting it several times the real hardware system becomes the virtual system on VM.

In one embodiment, a container executing on one network node (source node) is on-the-fly migrated to another network node (destination node). The destination node can be a different physical or virtual platform. As a non-limiting example, Linux operating system will be used to describe this embodiment in more detail. The exemplary embodiment can be used when it is desirable to migrate a container, such as a Virtual Private Server (VPS), or any other virtual execution environment, from one network computer to another network computer, preserving the execution state and performing this migration transparently to the users of the execution environment.

During the migration process, the state of the container, including the states of all active processes in the container, is frozen and saved into a dump file. The dump file is then transferred to another computer, where it is used to recreate the container in the state immediately prior to the migration. In preserving the state of the container, it is important to preserve the state of every process running in the container.

For example, if a process opened a file, located on an NFS server, after the migration is complete, the process should have the same file opened as if the migration never took place. This means that all network connections active in the container prior to initiation of the migration process should be active in the container after the migration is done.

One approach to accomplishing this task is to suspend, or "freeze" all the activity taking place in the container prior to initiating the migration process. This might be accomplished using a set of standard tools available in Linux kernel. In the frozen state, none of the processes in the container are executing any code and all the network connections between the container and the network are closed.

In this state, no network packet can be received by the container or leave the container. However, in this situation, even if the information that a certain process had an NFS file opened was preserved, it would not be possible to recreate this state on the migration destination node, since the container cannot communicate with the NFS server over the network, and cannot invoke any local driver on the NFS server.

One possible solution to this problem is to save complete state of the connection between the container and the NFS server, and not only the state related to the communication protocol, but the state of all the internal structures used by the container processes to connect to the NFS server. This is theoretically possible, but this approach has two major problems. First, this solution would be unwieldy, since the implementation of clients in different operating systems, Linux being one such operating system, requires manipulation of a large number of objects and preserving the state of every one of these objects would require a lengthy and extensive software development effort.

In addition, the program code created for this purpose would have to be modified for different clients, since the client implementation might be different from one Linux kernel to another. Second, the size of the resulting file may be prohibitively large and would require a certain period of time for transfer to the destination computer to occur. During this time, network availability would be negatively impacted.

Figure 5:
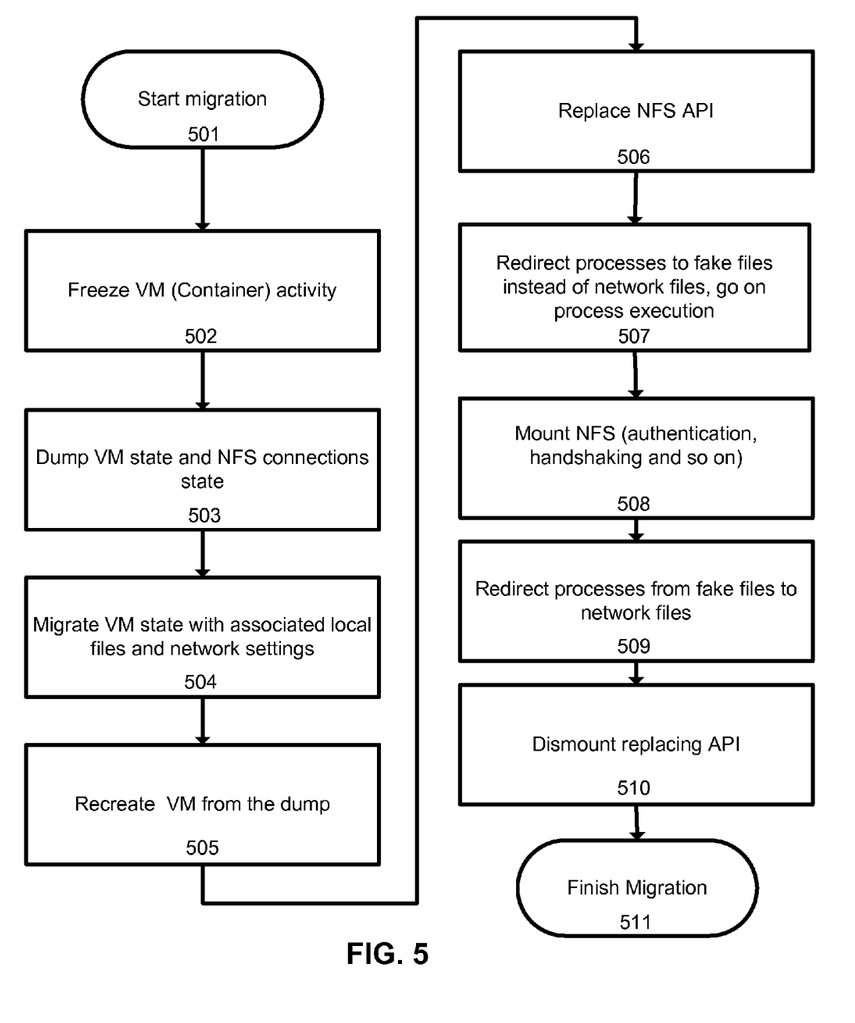
FIG. 5 is a flowchart illustrating the process of on-the-fly migration of a container from one network node to another.

FIG. 5 illustrates a flowchart of an embodiment offering an alternative solution. In step 501, the migration process is initiated. In step 502, all processes in the container and all network connectivity between the container and the NFS server are "frozen". In step 503, a dump file of all the activity in the container, and, in particular, the information pertaining to the files opened on the NFS server by various container processes is created.

Note that it is not necessary to rely on the functionality of the NFS server for this purpose, since the Linux kernel maintains the cached copy of all open file objects, along with the full path to each file. The respective file paths are stored in the dump file as well. This path information to opened files could be retrieved from the Linux cache for any file system even when the container is frozen. The information that these files were open on the NFS server at the time migration was initiated is also stored in the dump file.

In step 504, the dump file, containing the container state information, including the network settings and open NFS files, is migrated to the destination platform. In step 505, the container is restarted on the destination machine using the information stored in the dump file. First step of this restoration process is restoration of the physical memory. The local file system is mounted next. Then the system processes are restarted in the physical memory. The file system, mounted in the container prior to all activity in the container being frozen, would need to be remounted in the container on the destination machine.

However, if a file system was mounted in a certain NFS directory, this file system cannot be remounted, since the network connectivity between the container and the NFS server at this stage of the migration process is still blocked. To solve this problem, the blocking file system (BFS) of the present embodiment is mounted instead. This file system will be described in detail further. Next, all the container processes that had opened files on the NFS server prior to the migration are reinitialized.

In step 506, the standard NFS Application Programming Interface in the container is replaced with the API of the present embodiment. This is done because the network connectivity between the container and the NFS server is still frozen. In step 507, this replacement API redirects the container processes that had the NFS files opened prior to the migration, or attempted to access a file system during the container migration process, to the file system of the present embodiment—the blocking file system.

This system consists of the files that are "fake" files in a sense that they correspond to the real files located on the NFS server, but do not contain any data that is stored in the real files. Instead of this data, the fake files contain the full path to the real files that they replace as a target of the function calls from the replacement API.

The operation of the "fake" file system, which may also be referred to as a blocking file system, will now be described in more detail. The Linux kernel of the present embodiment is modified in such a way that when a given process issues a call directed to a "fake" file (to write to a file, or read from a file, or collect certain information about a file, etc.), this process is put by the modified Linux kernel into "unkillable" state and its execution is suspended.

This suspension is necessary because, at this stage of the migration process, the real files cannot be accessed, since the network connectivity to the NFS server has not yet been restored.

In step 508, the NFS is mounted in the container. All processes that were active in the container prior to initiation of the migration are activated and begin to execute. The network connectivity between the migrated container and the NFS server is restored as well.

In step 509, file access requests from the container processes, remaining in suspension, are redirected from the "fake" file system to the real file system mounted on the NFS server. This is accomplished utilizing system calls available in the Linux kernel. The suspended processes are made, transparently to these processes, to reissue file calls while being brought out of suspension. These file calls are redirected, as stated above, to the real files located on the NFS server.

In step 510, the replacement API is dismounted, since it is no longer needed, and is replaced with the standard NFS API. At this point the migration process is complete (step 511).

Figure 6:
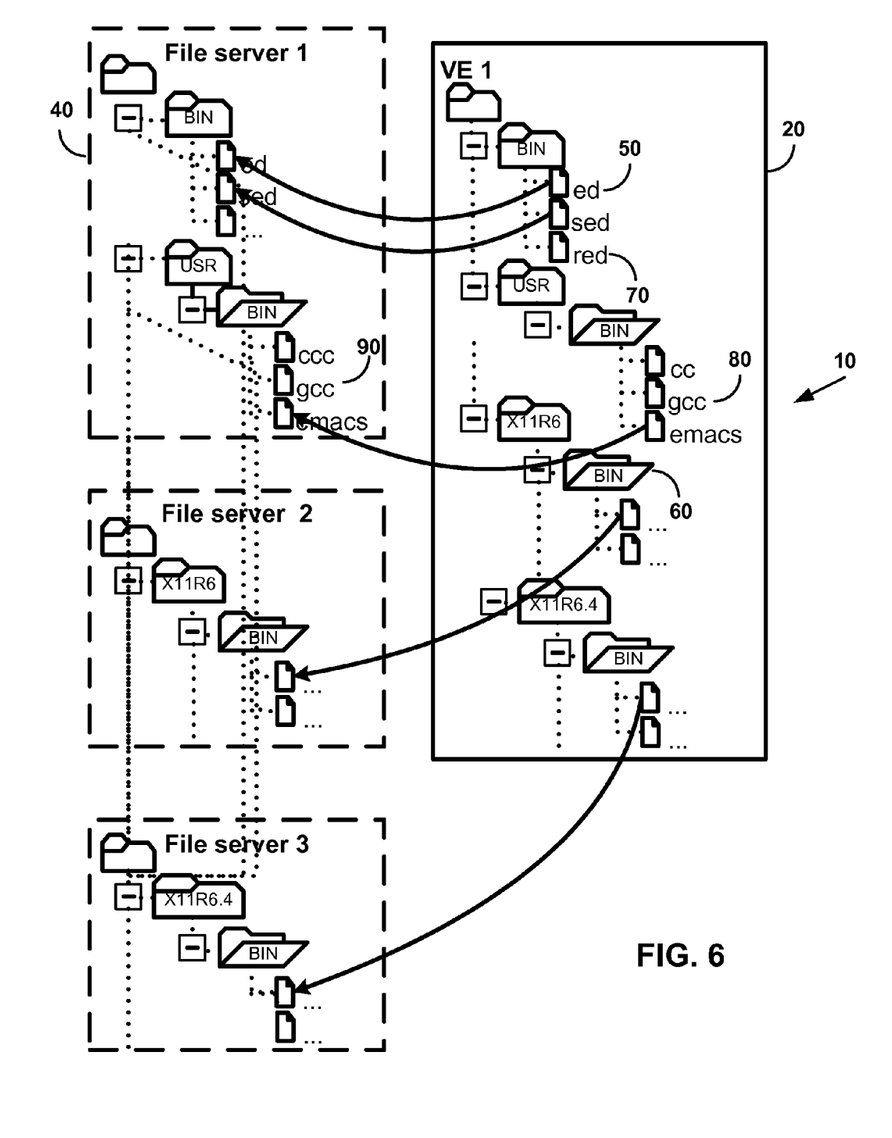
FIG. 6 illustrates an example of utilization of network drives.

FIG. 6 illustrates an example of utilization of network drives, with the relationship between a local storage and network drives, e.g. distributed network dries. Local data storage files could appear in read-only links 50 in local storage 20 file system and in form of real files 70, 80 and/or folders 60 stored locally both redirections and real objects are visible from the same data file storage 20 tree. Data storage files visible from local data storage 20 using links or stubs or similar mechanism could be placed on one or more file servers 40 where real files may be read (downloaded) and/or updated.

As shown in FIG. 1, the first data storage file system tree 20 is never changed and is kept in one copy so that it can be seen by all of the computer users. The second data storage file system tree 30 is kept only in the personal private area of the computer user, and it is unique. If a search is made for some data storage file in such a structure, the data storage file is sought out twice: first, in the private tree 30 for write-ability; then second, in the common read-only tree 20, in the case of failure.

Opening of data storage files in the read-only mode is carried out in two stages. First, an attempt is made to open the data storage file in the personal private modification area of the computer user 30. Then in case of failure, the data storage file is opened in the common read-only shared area 20.

Writing data into data storage files is carried out only in the personal area of the computer user. At first, it is defined if such a data storage file exists in the personal area. And then it is opened for write-ability in the case of a successful search. If the data storage file does not exist, then the data storage file is copied into the private area 30 of the computer user from the shared data storage file system tree 20 and the obtained copy of the data storage file is opened to allow the writing of data to the data storage file.

Accordingly, from the point of view of the computer user, the computer user has only one data storage file system tree within the data storage file system that can be modified in every place. Nevertheless, only the difference between the data storage file system common to all of the users of the computer and the modified user copy is actually stored. The shared part of the data storage file system is preserved in the computer only in one copy, and it does not need duplication.

In case the data storage file is removed, the data storage file is just marked as removed in the personal area of the computer user and the search procedure, when such notation exists, is finished with the reply to the computer user that the file does not exist.

Such organization of work of the data storage file system sufficiently simplifies the implementation of journaling because all the changes for every computer user are localized and kept in his/her private area. The consequences of writing into a private area are conditioned by algorithms that: i) service the file system, and ii) could be easily tracked by special processes of the operating system that serve the procedures of journaling. Accordingly, this method for reusing a common template file system may form the separate private modification area as a transaction and could store the separate private modification area in a manner that allows the organization of the standard journaling.

Those of ordinary skill in the art will understand that numerous embodiments have been enabled by the above disclosed invention. Such other embodiments shall be included within the scope and meaning of the appended claims.

Figure 7:
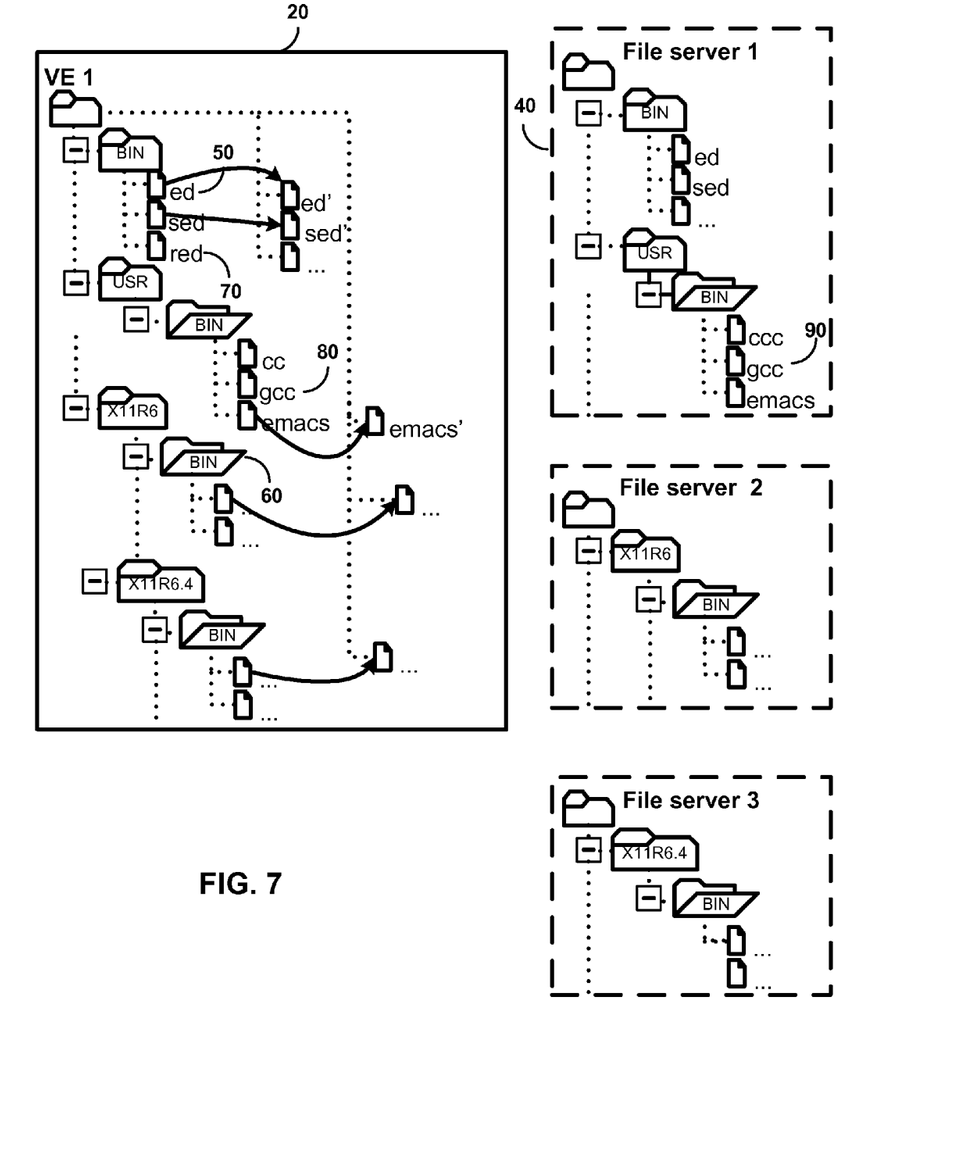
FIG. 7 shows a virtual server, reconstructed on a new node.

FIG. 7 shows a stage of reconstruction of a virtual server on a new node. Here, links 50 are still valid, but redirects user to fake files being stored on the local storage.

Figure 8:
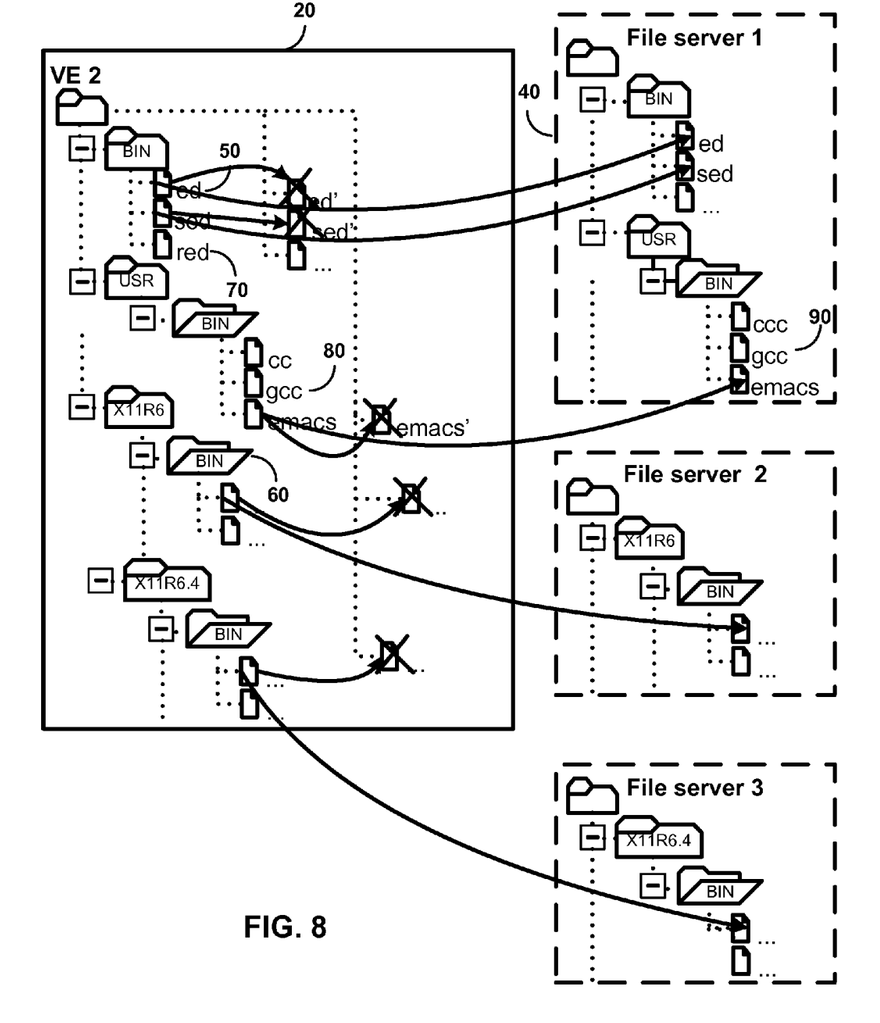
FIG. 8 shows a virtual server after network connectivity has been re-established and the processes have been redirected from "fake" files to real NFS files.

FIG. 8 shows a virtual server after network connectivity has been re-established and the processes have been redirected from "fake" files to real NFS files. Here, "crosslined" fake files became invalid and redirections to files stored on file servers are restored.

As yet another option, the shared storage drive can be a template file system storage that is similar on the old platform and on the new platform. The simplest example of "similar" is "Program Files" folder and its content. There might be different names of root directories on different platforms or even different number of directories containing "Program Files" data, such as C:\Program Files, D:\Program Files, E:\My Program Files, and so on. Files and folders related to identical programs may have different names, metadata and other attributes (as a user might accept during installation and based on what the installer did). Another example of "similar" data is migration from one cloud to another. Targeted clouds may have similar or identical templates for mounting a user's infrastructure.

Figure 3:
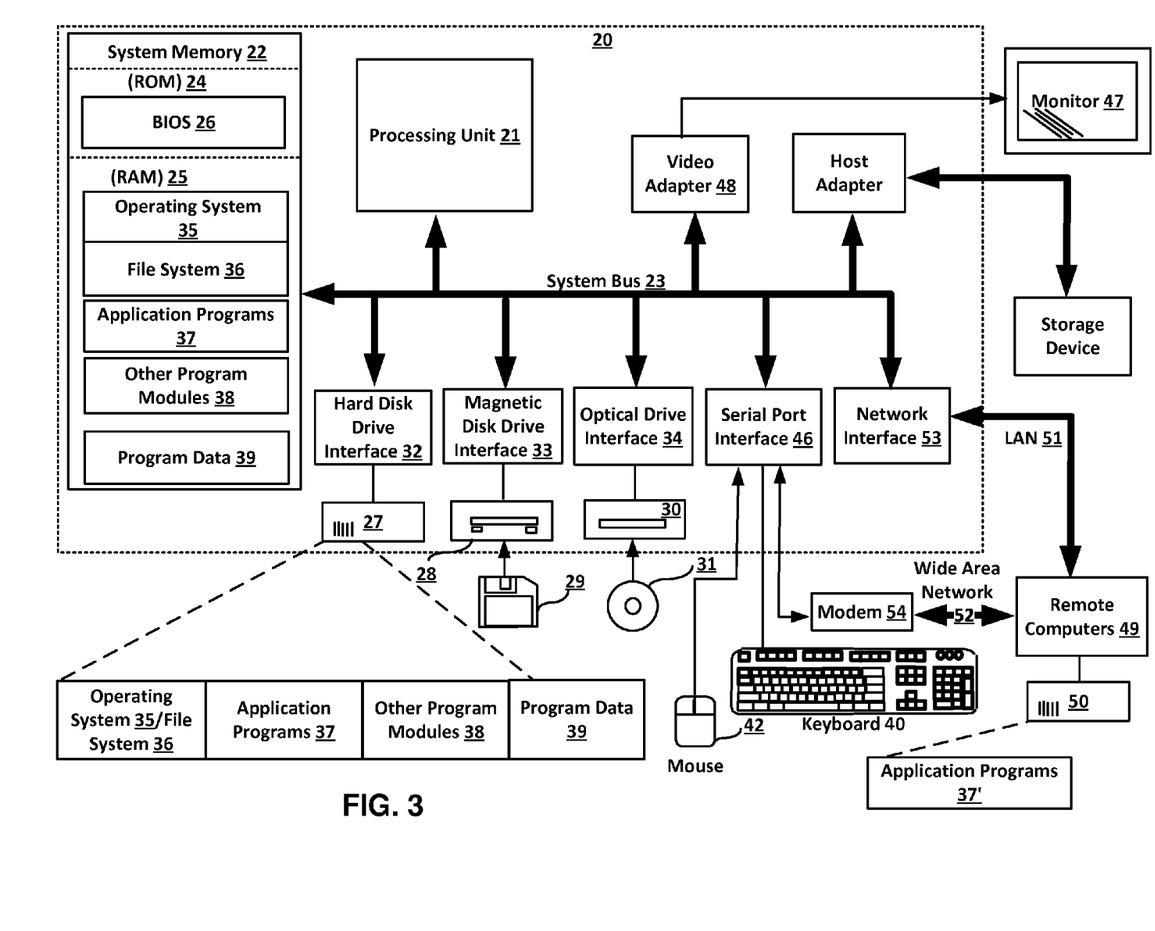
FIG. 3 is an example of the computing system where the present invention may be implemented.

With reference to FIG. 3, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39.

A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described the preferred embodiments, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for migration of a virtual execution environment (VEE), the method comprising:
   suspending active processes in the VEE;
   storing a state of the active processes into a dump file;
   transmitting the dump file to a new platform;
   on the new platform, mounting a blocking file system having a blocking state and a restarting state, such that when the blocking file system is in the blocking state, any access request directed to a file system of the VEE on a shared storage drive is blocked and redirected to the blocking file system;
   starting the active processes on the new platform from the dump file;
   connecting to the shared storage drive; and
   transitioning the blocking file system to the restarting state where and unblocking previously blocked access requests while connecting to the shared storage drive; and
   dismounting the blocking file system,
   wherein the migration is transparent to a user of the VEE, and
   wherein the VEE uses a standard Application Programming Interface (API) to access the file system of the VEE.

2. The method of claim 1, further comprising placing at least some of the active processes attempting to access the file system of the VEE into an unkillable state.

3. The method of claim 2, wherein placing of the at least some of the active processes into the unkillable state is performed by a modified operating system kernel.

4. The method of claim 1, further comprising replacing the API during the migration.

5. The method of claim 4, wherein in order to complete the migration, the replaced API is dismounted and replaced by the standard API.

6. The method of claim 1, wherein the shared storage drive is a networked storage drive.

7. The method of claim 1, wherein the mounting of the blocking file system includes replacing an API of the shared storage drive file system with an API of the blocking file system.

8. The method of claim 1, wherein the shared storage drive is a template file system storage.

9. The method of claim 1, wherein reconnecting to the shared storage drive includes reconfiguring connection of the active processes to the shared storage drive.

10. The method of claim 9, wherein the reconfiguring includes updating IP address to IP address of the new platform.

11. The method of claim 9, wherein the reconfiguring includes updating a root directory name to a root directory name of the new platform.

12. A non-transitory computer useable storage medium having computer executable program logic stored thereon for executing on a processor, the program logic for migrating a virtual execution environment (VEE) using the following steps:
   suspending active processes in the VEE;
   storing a state of the active processes into a dump file;
   transmitting the dump file to a new platform;
   on the new platform, mounting a blocking file system having a blocking state and a restarting state, such that when the blocking file system is in the blocking state, any access request directed to a file system of the VEE on a shared storage drive is blocked and redirected to the blocking file system;
   starting the active processes on the new platform from the dump file;
   connecting to the shared storage drive; and
   transitioning the blocking file system to the restarting state where and unblocking previously blocked access requests while connecting to the shared storage drive; and
   dismounting the blocking file system,
   wherein the migration is transparent to a user of the VEE, and
   wherein the VEE uses a standard Application Programming Interface (API) to access the file system of the VEE.

13. A system for migrating a virtual execution environment (VEE), the system comprising:
   a processor;
   a memory;
   computer code loaded into the memory for performing the following steps:
   suspending active processes in the VEE;
   storing a state of the active processes into a dump file;
   transmitting the dump file to a new platform;
   on the new platform, mounting a blocking file system having a blocking state and a restarting state, such that when the blocking file system is in the blocking state, any access request directed to a file system of the VEE on a shared storage drive is blocked and redirected to the blocking file system;
   starting the active processes on the new platform from the dump file;
   connecting to the shared storage drive; and
   transitioning the blocking file system to the restarting state where and unblocking previously blocked access requests while connecting to the shared storage drive; and
   dismounting the blocking file system,
   wherein the migration is transparent to a user of the VEE, and
   wherein the VEE uses a standard Application Programming Interface (API) to access the file system of the VEE.

14. The system of claim 13, further comprising placing at least some of the active processes attempting to access the file system of the VEE into an unkillable state.

15. The system of claim 13, further comprising replacing the API during the migration.

16. The system of claim 13, wherein the mounting of the blocking file system includes replacing an API of the shared storage drive file system with an API of the blocking file system.

17. The system of claim 13, wherein reconnecting to the shared storage drive includes reconfiguring connection of the active processes to the shared storage drive.

18. A method for migration of a virtual execution environment (VEE), the method comprising:
   suspending processes in the VEE;
   storing a state of the processes into a dump file;
   making the dump file accessible to a new platform;
   on the new platform, mounting a blocking file system having a blocking state and a restarting state, such that when the blocking file system is in the blocking state, any access request directed to a file system of the VEE on a shared storage is blocked and redirected to the blocking file system;
   starting the processes on the new platform from the dump file;

connecting to the shared storage; and transitioning the blocking file system to the restarting state where and unblocking previously blocked access requests while connecting to the shared storage, wherein the migration is transparent to a user of the VEE, and wherein the VEE uses a standard Application Programming Interface (API) to access the file system of the VEE.

19. A system for migrating a virtual execution environment (VEE), the system comprising:

a processor;

a memory;

computer code loaded into the memory for performing the following steps:

suspending processes in the VEE;

storing a state of the processes into a dump file;

on a new platform, mounting a blocking file system having a blocking state and a restarting state, such that when the blocking file system is in the blocking state, any access request directed to a file system of the VEE is blocked and redirected to the blocking file system;

starting the processes on the new platform from the dump file; and transitioning the blocking file system to the restarting state where and unblocking previously blocked access requests while the file system of the VEE is made available for access, wherein the migration is transparent to a user of the VEE, and wherein the VEE uses a standard Application Programming Interface (API) to access the file system of the VEE.

* * * * *